(12) United States Patent
Yamashita et al.

(10) Patent No.: US 11,555,983 B2
(45) Date of Patent: Jan. 17, 2023

(54) LIGHT SOURCE MODULE

(71) Applicant: Hitachi-LG Data Storage, Inc., Tokyo (JP)

(72) Inventors: Masashi Yamashita, Tokyo (JP); Fumihito Ichikawa, Tokyo (JP); Kazuhiro Aoyama, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 183 days.

(21) Appl. No.: 17/078,128

(22) Filed: Oct. 23, 2020

(65) Prior Publication Data

US 2021/0263261 A1   Aug. 26, 2021

(30) Foreign Application Priority Data

Feb. 20, 2020  (JP) .............................. JP2020-027240

(51) Int. Cl.
*G02B 7/182* (2021.01)
(52) U.S. Cl.
CPC ................................... *G02B 7/182* (2013.01)
(58) Field of Classification Search
CPC .............................. G02B 7/182; G02B 7/1821
USPC ........................................................ 359/871
See application file for complete search history.

(56) References Cited

U.S. PATENT DOCUMENTS

| 2,625,359 | A | * | 1/1953 | Johnh | G02B 7/182 248/466 |
| 4,732,440 | A | * | 3/1988 | Gadhok | G02B 7/1821 359/214.1 |
| 5,592,337 | A | * | 1/1997 | Hama | G02B 26/12 359/872 |
| 6,928,044 | B2 | * | 8/2005 | Tachikawa | G02B 7/00 369/112.29 |
| 2002/0030903 | A1 | * | 3/2002 | Lu | G02B 7/1825 359/871 |
| 2003/0137708 | A1 | * | 7/2003 | Takase | G02B 7/182 359/216.1 |
| 2006/0132879 | A1 | * | 6/2006 | Kim | G02B 26/127 359/200.1 |
| 2006/0132881 | A1 | * | 6/2006 | Kim | G02B 26/125 359/871 |
| 2015/0002594 | A1 | * | 1/2015 | Ishidate | G03G 15/04072 359/205.1 |

(Continued)

FOREIGN PATENT DOCUMENTS

| JP | 2000-131583 W | 5/2000 |
| JP | 2006243438 A * | 9/2006 |

(Continued)

OTHER PUBLICATIONS

Chinese Office Action received in corresponding Chinese Application No. 202011169164.9 dated Feb. 22, 2022.

(Continued)

*Primary Examiner* — Ricky D Shafer
(74) *Attorney, Agent, or Firm* — Mattingly & Malur, PC

(57) ABSTRACT

There is provided a light source module in which an optical element is accommodated in a housing, in which three projection portions are provided in the housing, and the light source module has a structure where the optical element is pressed to be brought into contact with the three projection portions by a pressing member, so that the optical element is fixed in the housing.

8 Claims, 4 Drawing Sheets

(56) References Cited

U.S. PATENT DOCUMENTS

2018/0106997 A1   4/2018  Ochi et al.
2018/0321463 A1*  11/2018 Staley ................. G02B 27/141
2019/0285834 A1*  9/2019  Erbe ...................... G02B 7/182

FOREIGN PATENT DOCUMENTS

| JP | 2008-180856 W | 8/2008 |
| JP | 2014-229334 A | 12/2014 |
| JP | 2015-064919 A | 4/2015 |

OTHER PUBLICATIONS

Chinese Office Action received in corresponding Chinese Application No. 202011169164.9 dated May 27, 2022.

* cited by examiner

LIGHT SOURCE MODULE

CROSS-REFERENCE TO RELATED APPLICATION

The present application claims priority from Japanese application JP 2020-027240, filed on Feb. 20, 2020, the contents of which is hereby incorporated by reference into this application.

BACKGROUND OF THE INVENTION

1. Field of the Invention

The present invention relates to a light source module including a light source and an optical element such as a mirror.

2. Description of the Related Art

A light source module of a video output device or a light source module that is used in an optical pickup device used in an optical disk drive includes an optical element such as a mirror which aligns optical axes from light sources. Since an error in the mounting posture of the optical element causes a color misregistration or reproduction error, highly accurate mounting without error is required.

JP 2015-64919 A is a related art document related to the technical field. JP 2015-64919 A discloses an optical component fixing structure that fixes a flat optical component to a housing, in which the housing includes an optical component groove that holds the optical component and first and second housing surfaces facing surfaces of the optical component, the second housing surface of the housing is provided with three projections that position the optical component, and the optical component is pressed against the three projections to be positioned and is fixed by a UV curable adhesive.

However, in the structure described in JP 2015-64919 A, since the optical component is fixed to the housing by using the adhesive, the posture of the optical component may be changed due to an error in the outer dimensions of an optical element or the influence of thermal expansion or contraction which is a temperature characteristic of the adhesive, and there is a problem in obtaining highly accurate mounting.

SUMMARY OF THE INVENTION

Therefore, an object of the invention is to solve the problem and provide a light source module that suppresses an error in mounting posture independent of an error in the outer dimensions of an optical element or the influence of thermal expansion or contraction of an adhesive.

As an example of the invention, there is provided a light source module in which an optical element is accommodated in a housing, in which three projection portions are provided in the housing, and the light source module has a structure where the optical element is pressed to be brought into contact with the three projection portions by a pressing member, so that the optical element is fixed in the housing.

According to the invention, it is possible to provide the light source module that suppresses an error in mounting posture independent of an error in the outer dimensions of the optical element or the influence of thermal expansion or contraction of the adhesive.

DETAILED DESCRIPTION OF THE PREFERRED EMBODIMENTS

Hereinafter, an embodiment of the invention will be described with reference to the drawings.

Embodiment

Figure 1:
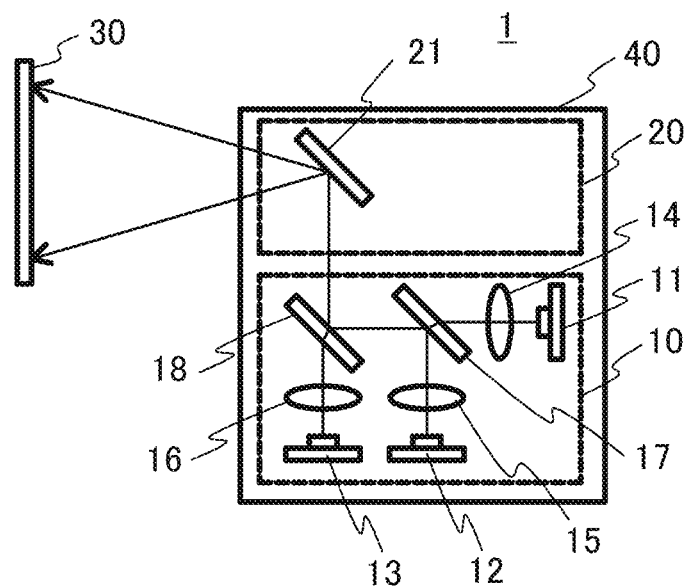
FIG. 1 is a schematic configuration diagram of an image drawing device in an embodiment.

In the present embodiment, an image drawing device will be described as an example. FIG. 1 is a schematic configuration diagram of the image drawing device in the embodiment. An image drawing device 1 in FIG. 1 is an image drawing device using a reflection mirror with a scanning function, in which a light source module 10 and a reflection mirror 20 with a scanning function are installed in a housing 40 to draw an image on a screen 30.

The light source module 10 includes green, blue, and red laser beam sources 11, 12, and 13, and is provided with dichroic mirrors 17 and 18 that are wavelength-selective optical elements which align the optical axes of laser beams from the laser beam sources. Reference signs 14, 15, and 16 denote collimating lenses that makes rays of light parallel to each other. Light emitted from the dichroic mirror 18 is reflected and scanned by a mirror 21 inside the reflection mirror 20 with a scanning function to draw an image on the screen 30.

Here, for example, when there is an error in the mounting posture of the dichroic mirrors 17 and 18, the error causes a color misregistration on the screen, and thus very highly accurate mounting without error is required. The cause of the mounting error is considered to be, for example, an error in the outer dimensions of the optical element or, when an adhesive is used for mounting, the influence of thermal expansion or contraction which is a temperature characteristic of the adhesive.

Therefore, the present embodiment provides the light source module that suppresses an error in mounting posture independent of an error in the outer dimensions of the optical element or the influence of thermal expansion or contraction of the adhesive. For this reason, in a structure of the present embodiment, the mounting of the optical element to the housing is not fixed by the adhesive, but the optical element is pressed to be brought into contact with three projection portions, which are provided in the housing, by using a leaf spring which is a pressing member, so that the optical element is fixed to the housing.

Figure 2:
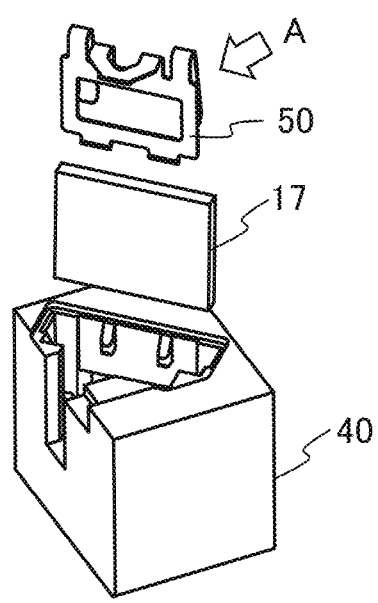
FIG. 2 is an exploded configuration perspective view illustrating a configuration of a part of a light source module in the embodiment.

FIG. 2 is an exploded configuration perspective view illustrating a configuration of a part of the light source module in the embodiment. FIG. 2 is an exploded configuration perspective view where the dichroic mirror 17 of the light source module 10 is pressed to be brought into contact with the housing 40 by a pressing member 50 in FIG. 1. Incidentally, the same configuration is also applied to the dichroic mirror 18 and here, a description thereof will be omitted. In FIG. 2, the dichroic mirror 17 and the pressing member 50 are inserted into the housing 40 and the dichroic mirror 17 is pressed in the housing 40 by the pressing member 50, so that the dichroic mirror 17 is fixed in the housing 40.

Figure 3:
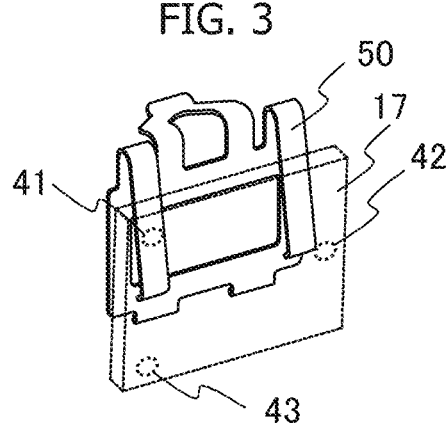
FIG. 3 is a perspective view as a pressing member in FIG. 2 is seen from direction A.

FIG. 3 is a perspective view as the pressing member 50 in FIG. 2 is seen from direction A. For reference, FIG. 3 also illustrates a positional relationship between the pressing member 50 and the dichroic mirror 17 when the dichroic mirror 17 is pressed by the pressing member 50. Incidentally, reference signs 41, 42, and 43 denote projections installed in the housing 40, and details thereof will be described later.

Figure 4:
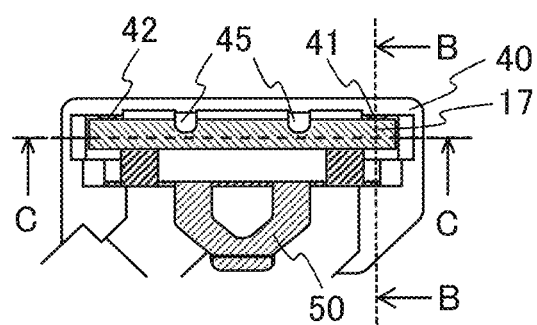
FIG. 4 is a top view illustrating a state where a dichroic mirror and the pressing member are inserted into a housing in the embodiment.

FIG. 4 is a top view illustrating a state where the dichroic mirror 17 and the pressing member 50 are inserted into the housing 40. In FIG. 4, the dichroic mirror 17 is brought into contact with and pressed against projections 41, 42, and 43, which are installed in the housing 40, by the pressing member 50. Incidentally, reference sign 45 denotes a retaining protrusion portion installed in the housing 40, and details thereof will be described later.

Figure 5:
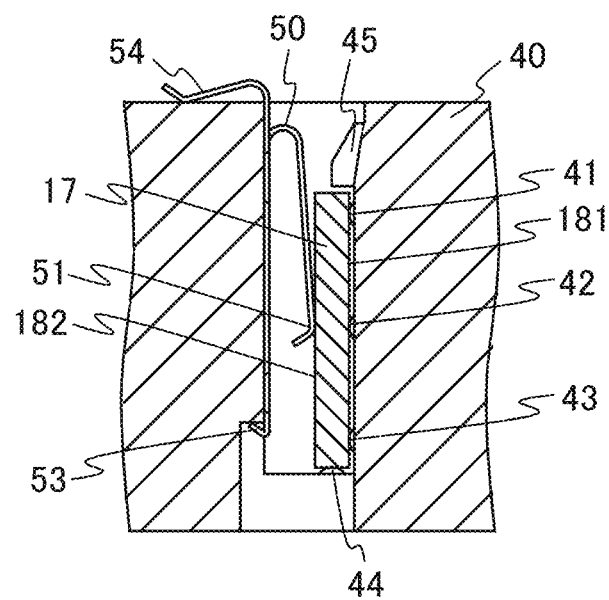
FIG. 5 is a cross-sectional view as seen from B-B in FIG. 4.

FIG. 5 is a cross-sectional view as seen from B-B in FIG. 4. In FIG. 5, the housing 40 includes the projections 41, 42, and 43, a holding portion 44, and a retaining protrusion portion 45. In addition, the pressing member 50 includes a first pressing portion 51, a first fitting portion 53, and a second fitting portion 54. In addition, reference sign 181 denotes a reflective surface of the dichroic mirror 17, and reference sign 182 denotes a back surface with respect to a reflective surface 181.

In FIG. 5, the dichroic mirror 17 is inserted between the holding portion 44 and the retaining protrusion portion 45 of the housing 40. The retaining protrusion portion 45 is a member that prevents the dichroic mirror 17 from falling off the housing 40. The pressing member 50 is fixed to the housing 40 by the first fitting portion 53 and the second fitting portion 54. Then, a back surface 182 of the dichroic mirror 17 is pressed by the first pressing portion 51 of the pressing member 50, so that a reflective surface 181 side is brought into contact with and pressed against the projections 41, 42, and 43 installed in the housing 40. Incidentally, it is needless to say that in the housing 40, central portions on the reflective surface 181 side and a back surface 182 side of the dichroic mirror 17 are provided with openings through which light passes.

Figure 6:
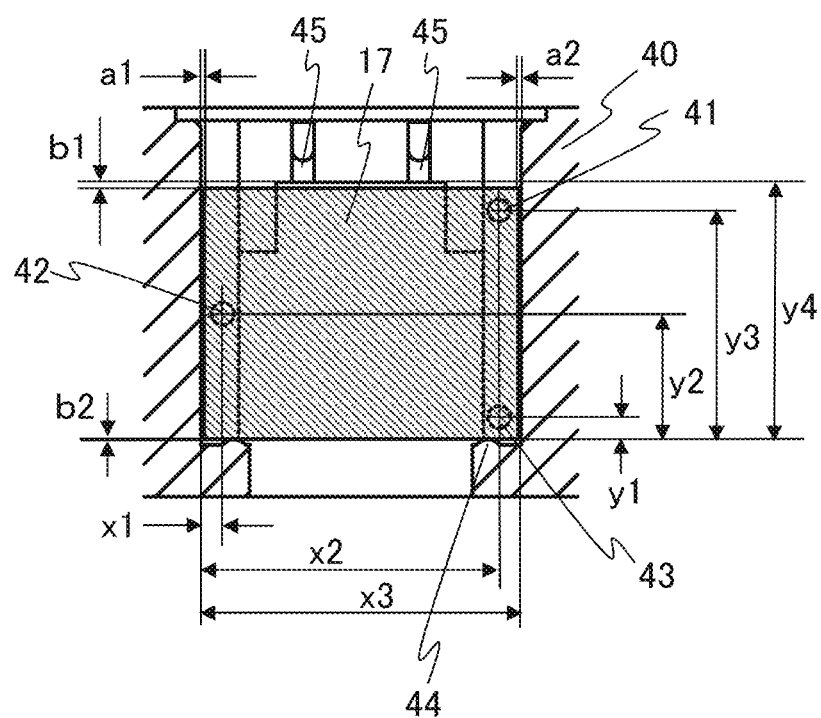
FIG. 6 is a cross-sectional view as seen from C-C in FIG. 4.

FIG. 6 is a cross-sectional view as seen from C-C in FIG. 4. In FIG. 6, the positions of the projections 41, 42, and 43 over the dichroic mirror 17 are illustrated to describe the dimensional relationship between the projections 41, 42, and 43 installed in the housing 40.

In FIG. 6, in consideration of the outer dimensions of the dichroic mirror 17, the dimensional relationship is set such that the dichroic mirror 17 does not deviate from the projections 41, 42, and 43 even if the position of the dichroic mirror 17 is shifted in an in-plane direction.

Namely, when the dimensions of a portion of the housing 40, the dichroic mirror 17 being inserted into the portion, are x3 in a lateral direction and y4 in a longitudinal direction, and intervals between the housing 40 and the dichroic mirror 17 are a2 and a1 on right and left sides in the lateral direction and are b1 and b2 on upper and lower sides in the longitudinal direction, coordinates P1, P2, and P3 of the positions of the tips of the projections 41, 42, and 43 are as follows.

P1: (x2, y3)
P2: (x1, y2)=(x1, (y1+y3)/2)
P3: (x2, y1)

In addition, the dimensional relationship between the coordinates is as follows.

x1>(a1+a2) and (x3−x2)>(a1+a2)
y1>(b1+b2) and (y4−y3)>(b1+b2)
y2=(y1+y3)/2

Figure 7:
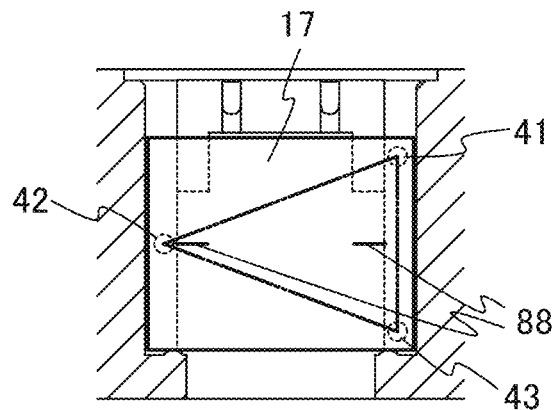
FIG. 7 is a view illustrating a relationship between projections and a pressing position in the embodiment.

FIG. 7 is a view illustrating a relationship between a pressing position where the dichroic mirror 17 is pressed by the first pressing portion 51 and the projections 41, 42, and 43. In FIG. 7, the same reference signs are assigned to the same configurations as those in FIG. 6 and descriptions thereof will be omitted. In FIG. 7, a pressing position 88 where the dichroic mirror 17 is pressed by the first pressing portion 51 is installed within a range that is defined when a triangular range formed by the three projections 41, 42, and 43 on the reflective surface 181 is projected onto the back surface 182. Accordingly, the dichroic mirror 17 can be stably brought into contact with and pressed against the projections 41, 42, and 43.

Incidentally, as illustrated in FIG. 7, the triangle formed by the three projections 41, 42, and 43 is an isosceles triangle having a bottom side formed by the projections 41 and 43 and the projection 42 as a vertex, and it is desirable that the projections 41 and 43 are disposed on a straight line in a height direction and the coordinate of the projection 42 in the height direction is a median value of the coordinates of the projections 41 and 43.

Figure 8:
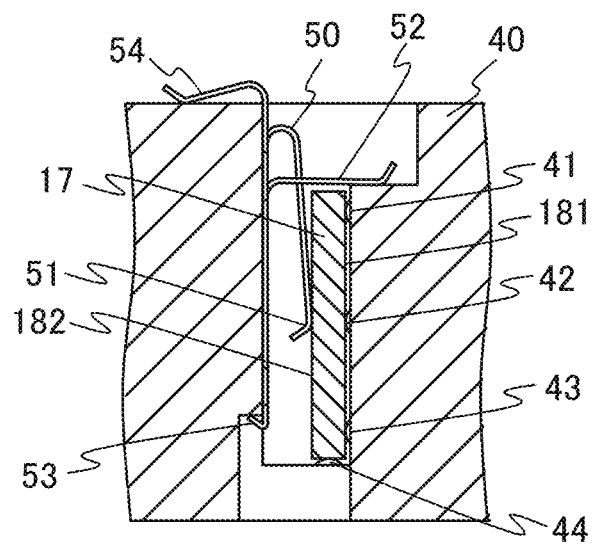
FIG. 8 is a view describing another configuration of the pressing member and the housing in the embodiment.

FIG. 8 is a view describing another configuration of the pressing member 50 and the housing 40. In FIG. 8, the same reference signs are assigned to the same configurations as those in FIG. 5 and descriptions thereof will be omitted. FIG. 8 differs from FIG. 5 in that the pressing member 50 includes a second pressing portion 52 and the housing 40 does not include the retaining protrusion portion 45.

In FIG. 5, the housing 40 is provided with the retaining protrusion portion 45 that prevents the dichroic mirror 17 from falling off the housing 40. In FIG. 8, instead, the pressing member 50 includes the second pressing portion 52 and the second pressing portion 52 prevents the dichroic mirror 17 from falling off. As described above, as preventing the dichroic mirror from falling off the housing, a wall for retaining may be formed in either of the housing 40 and the pressing member 50.

As described above, according to the present embodiment, it is possible to provide the light source module that has a structure where the position of the optical element may shifted in the in-plane direction as long as the reflective surface of the optical element is in contact with three projections, and that suppresses an error in mounting posture without being affected by thermal expansion or contraction of the adhesive since the fixing is not performed by the adhesive and further independent of the influence of an error in the outer dimensions of the optical element.

The embodiment has been described above; however, the invention is not limited to the above embodiment and includes various modification examples. For example, in the above embodiment, the image drawing device has been described as an example; however, the invention is applicable to a projector, an optical pickup device, a camera, and the like which use the light source module.

What is claimed is:
1. A light source module, comprising:
an optical element accommodated in a housing,
wherein three projection portions are provided in the housing, and wherein the light source module has a structure where the optical element is pressed to be brought into contact with the three projection portions by a pressing member, so that the optical element is fixed in the housing, wherein the housing includes a retaining protrusion portion that is above the three projection portions and does not contact the optical element, wherein the optical element includes a reflective surface and a back surface opposite the reflective surface, and each of the three projection portions contact the reflective surface of the optical element, wherein the pressing member includes a first pressing portion that contacts the back surface of the optical element at a point within a triangle formed by the three projection portions projected on the back surface of the optical element, and the first pressing portion does not contact the back surface of the optical element outside of the triangle projected on the back surface of the optical element.

2. The light source module according to claim 1, wherein the housing includes a holding portion, and wherein the optical element is inserted between the holding portion and the retaining protrusion portion.

3. The light source module according to claim 2, wherein the pressing member includes a first fitting portion and a second fitting portion, and the pressing member is fixed to the housing by the first fitting portion and the second fitting portion.

4. The light source module according to claim 1, wherein the pressing member is a leaf spring.

5. The light source module according to claim 1, wherein when dimensions of a portion of the housing, the optical element being inserted into the portion, are x3 in a lateral direction and y4 in a longitudinal direction, and intervals between the housing and the optical element are a2 and a1 on right and left sides in the lateral direction and are b1 and b2 on upper and lower sides in the longitudinal direction, coordinates P1, P2, and P3 of positions of tips of the three projection portions are:

P1: (x2, y3)
P2: (x1, y2)=(x1, (y1+y3)/2)
P3: (x2, y1)
where x>(a1+a2) and (x3−x2)>(a1+a2)
y1>(b1+b2) and (y4−y3)>(b1+b2)
y2=(y1+y3)/2.

6. The light source module according to claim 1, wherein the triangle formed by the three projection portions is an isosceles triangle having a bottom side formed by two projection portions disposed on a straight line in a height direction.

7. The light source module according to claim 1, wherein the housing includes a holding portion, wherein the pressing member includes a second pressing portion, wherein the optical element is inserted between the holding portion and the second pressing portion.

8. The light source module according to claim 7, wherein the pressing member includes a first fitting portion and a second fitting portion, and the pressing member is fixed to the housing by the first fitting portion and the second fitting portion.

* * * * *